United States Patent
Tsai et al.

(10) Patent No.: US 7,808,213 B2
(45) Date of Patent: Oct. 5, 2010

(54) FLEXIBLE POWER APPARATUS

(75) Inventors: Hsaio-Kuan Tsai, Tu-Chen (TW); Hung-Chang Chen, Tu-Chen (TW); Wen-Ting Lin, Caotun Township (TW)

(73) Assignee: Taiwan Textile Research Institute, Tu-Chen (TW)

(*) Notice: Subject to any disclaimer, the term of this patent is extended or adjusted under 35 U.S.C. 154(b) by 197 days.

(21) Appl. No.: 11/966,553

(22) Filed: Dec. 28, 2007

(65) Prior Publication Data
US 2009/0167237 A1    Jul. 2, 2009

(30) Foreign Application Priority Data
Dec. 26, 2007   (TW) .............. 96150293 A

(51) Int. Cl.
H02J 7/00    (2006.01)
H02J 7/04    (2006.01)
H01M 10/44   (2006.01)
H01M 10/46   (2006.01)

(52) U.S. Cl. ............... 320/166; 320/167; 320/101; 320/162

(58) Field of Classification Search ............ 320/101, 320/166, 167
See application file for complete search history.

(56) References Cited

U.S. PATENT DOCUMENTS

| | | | |
|---|---|---|---|
| 6,608,464 B1* | 8/2003 | Lew et al. | 320/107 |
| 2003/0033701 A1* | 2/2003 | Amatucci | 29/25.41 |
| 2003/0038610 A1* | 2/2003 | Munshi et al. | 320/101 |
| 2004/0053082 A1* | 3/2004 | McCluskey et al. | 429/9 |
| 2004/0232878 A1* | 11/2004 | Couch et al. | 320/101 |
| 2005/0140331 A1* | 6/2005 | McQuade | 320/101 |

* cited by examiner

*Primary Examiner*—Edward Tso
*Assistant Examiner*—Ahmed Omar
(74) *Attorney, Agent, or Firm*—Knobbe Martens Olson & Bear LLP

(57) ABSTRACT

A flexible power supply apparatus includes a flexible textile capacitor, a power source, a charging part, and a control circuit. The power source is electrically coupled with the flexible textile capacitor. The charging part for charging an electric product or a secondary battery is electrically coupled with the power source. The charging part and the flexible textile capacitor are connected in parallel. The flexible textile capacitor discharges a current to the charging part when the flexible textile capacitor is charged to a predetermined charging level. The control circuit for controlling the charging and discharging of the flexible textile capacitor, and the charging part is electrically coupled with the flexible textile capacitor the power source, and the charging part.

20 Claims, 8 Drawing Sheets

FLEXIBLE POWER APPARATUS

RELATED APPLICATIONS

This application claims priority to Taiwan Application Serial Number 96150293, filed Dec. 26, 2007, which is herein incorporated by reference.

BACKGROUND

1. Field of Invention

The present invention relates to a power supply apparatus. More particularly, the present invention relates to a flexible power supply apparatus.

2. Description of Related Art

Portable electronic apparatus such as video players and game players have gained popularity. Increased demand and usage of these devices have made power supplies for portable electronic products increasingly important.

Among the others, portable charging apparatus are used to solve the problem of power supply. However, most of the currently available charging apparatus are chargers with rigid casings that make them difficult to store. In addition, most charging apparatus use indoor alternating current as the power supply so that they are inconvenient to use.

SUMMARY

A flexible power supply apparatus and an energy storage textile are provided.

According to one embodiment of the present invention, a flexible power supply apparatus comprises a flexible textile capacitor, a power supply, a charging part, and a control circuit. The power supply is electronically coupled with the flexible textile capacitor. The charging part for charging an electronic product or a secondary battery is electronically coupled with the power supply. The charging part and the flexible textile capacitor are connected in parallel. The flexible textile capacitor discharges a current to the charging part when the flexible textile capacitor is charged to a predetermined charging level. The control circuit for controlling the charging and discharging of the flexible textile capacitor and the charging part is electrically coupled with the flexible textile capacitor, the power source, and the charging part.

According to another embodiment of the present invention, an energy storage textile is provided. The energy storage textile comprises a textile, a solar cell, a charging part, a flexible textile capacitor, and control circuit. The solar cell is disposed on the surface of the textile that is facing the light irradiation. The charging part for charging an electronic product or a secondary battery is electronically coupled with the solar cell. The flexible textile capacitor is disposed on the surface of the textile or within the textile. The flexible textile capacitor is electronically coupled with the solar cell, and the charging part. The flexible textile capacitor and the charging part are connected in parallel. The flexible textile capacitor discharges a current to the charging part when the flexible textile capacitor is charged to a predetermined charging level. The control circuit for controlling the charging and discharging of the charging part and the flexible textile capacitor is electronically coupled with the solar cell, the charging part, and the flexible textile capacitor.

The flexible power supply apparatus and energy storage textile according to the embodiments of the present invention are flexible so that they are easy to store and extremely portable.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
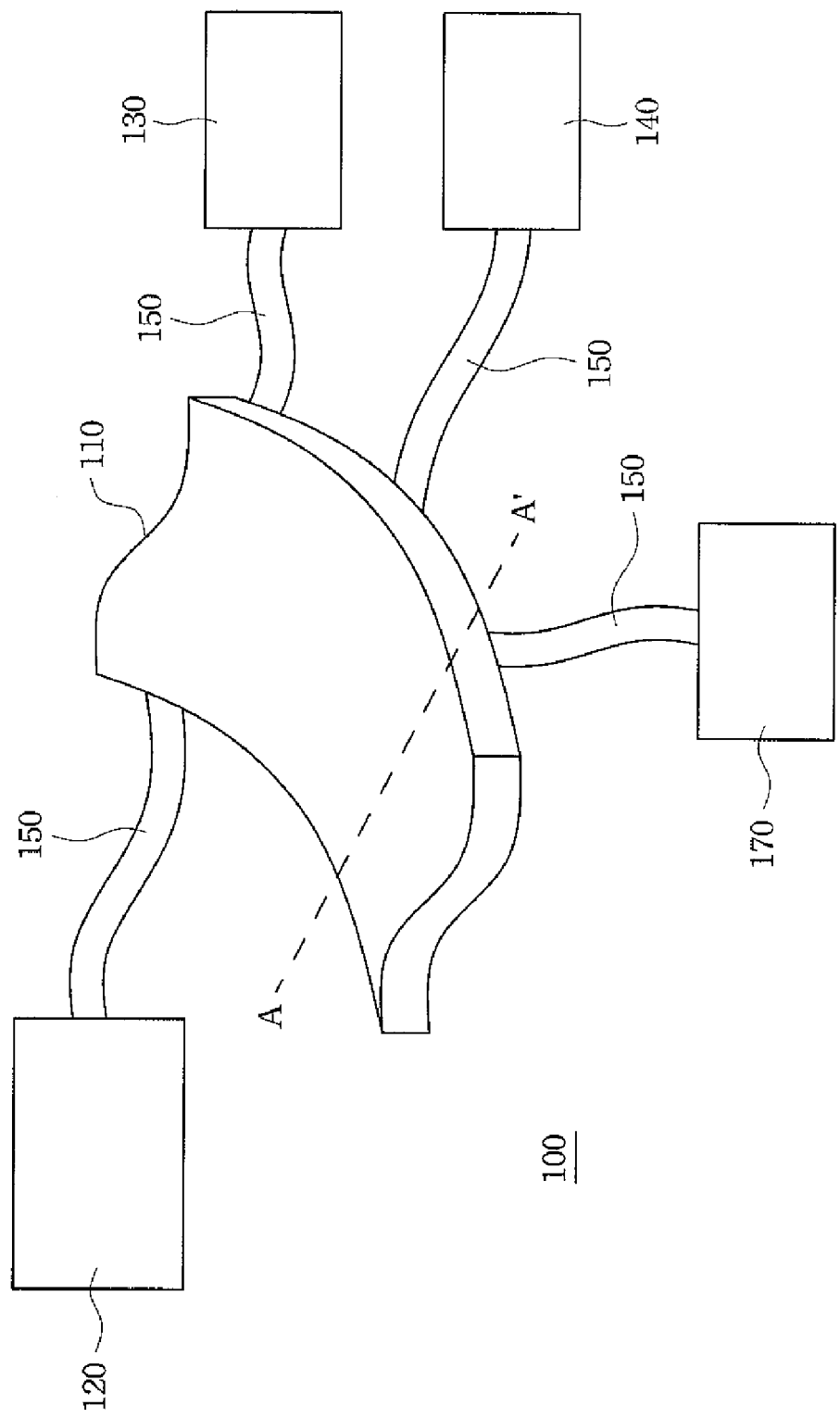
FIG. 1A is a schematic diagram illustrating the flexible power supply apparatus according to one embodiment of the present invention.

Reference will now be made in detail to the present embodiments of the invention, examples of which are illustrated in the accompanying drawings. Wherever possible, the same reference numbers are used in the drawings, and the description to refer to the same or like parts.

The Flexible Power Supply Apparatus

Figure 1B:
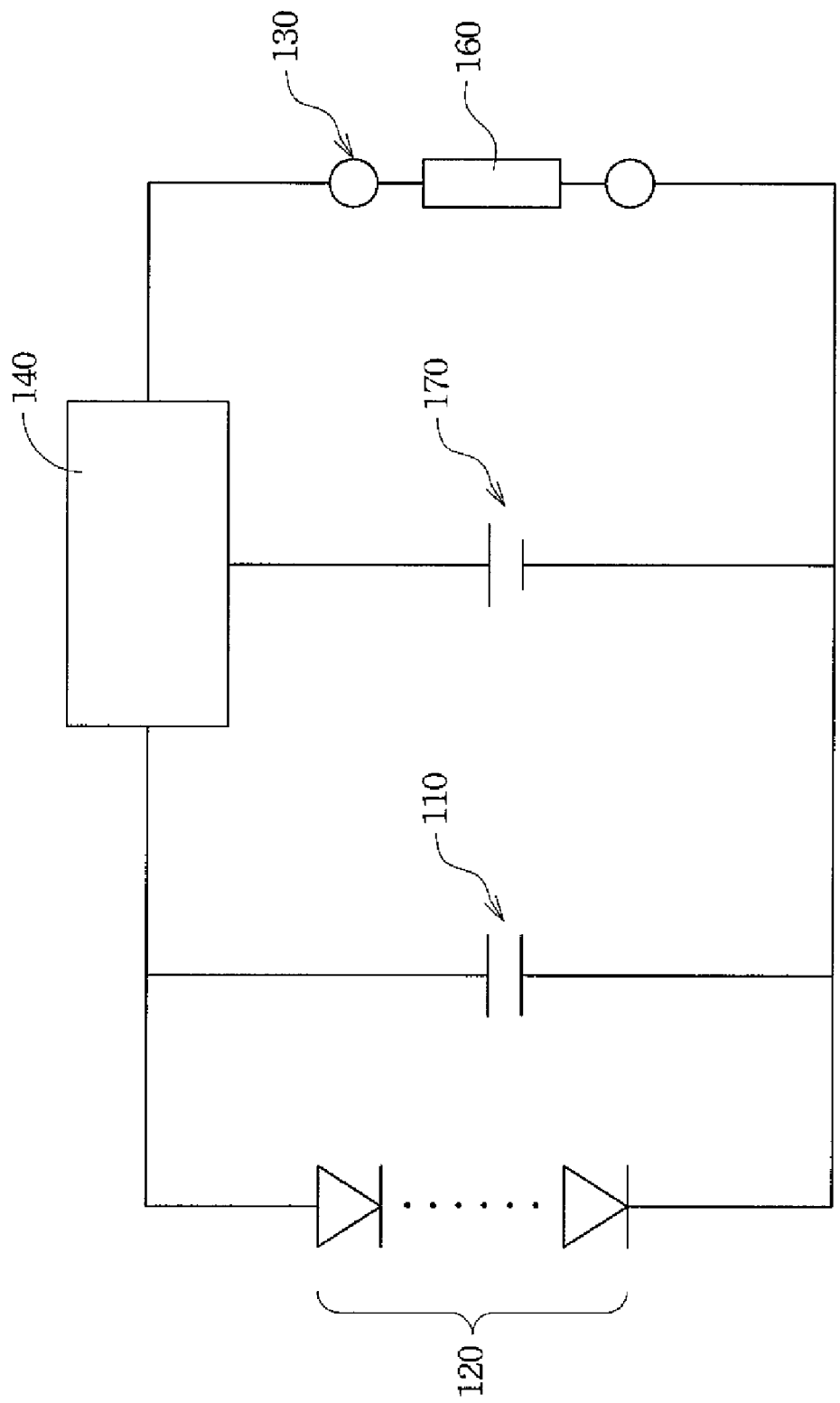
FIG. 1B is a schematic diagram illustrating the equivalent circuit of the flexible power supply apparatus of FIG. 1A.

FIG. 1A is a schematic diagram illustrating the flexible power supply apparatus according to one embodiment of the present invention. FIG. 1B is a schematic diagram illustrating the equivalent circuit of the flexible power supply is apparatus of FIG. 1A. In FIG. 1A and FIG. 1B, the flexible power supply apparatus 100 comprises a flexible textile capacitor 110, a power supply 120, a charging part 130, and a control circuit 140. The power supply 120 is electronically coupled with the flexible textile capacitor 110 via a conducting wire 150. The charging part 130 for charging the chargeable element 160 such as an electronic product or a secondary battery is electronically coupled with the power supply 120. The charging part 130 and the flexible textile capacitor 110 are connected in parallel. The flexible textile capacitor 110 discharges a current to the charging part 130 when the flexible textile capacitor 110 is charged to a predetermined charging level. The control circuit 140 for controlling the charging and discharging of the charging part 130 and the flexible textile capacitor 110 is electronically coupled with the flexible textile capacitor 110, the power supply 120, and charging part 130. For example, the control circuit 140 controls the flexible textile capacitor 110 so as to discharge a current to the charging part 130.

Figure 1C:
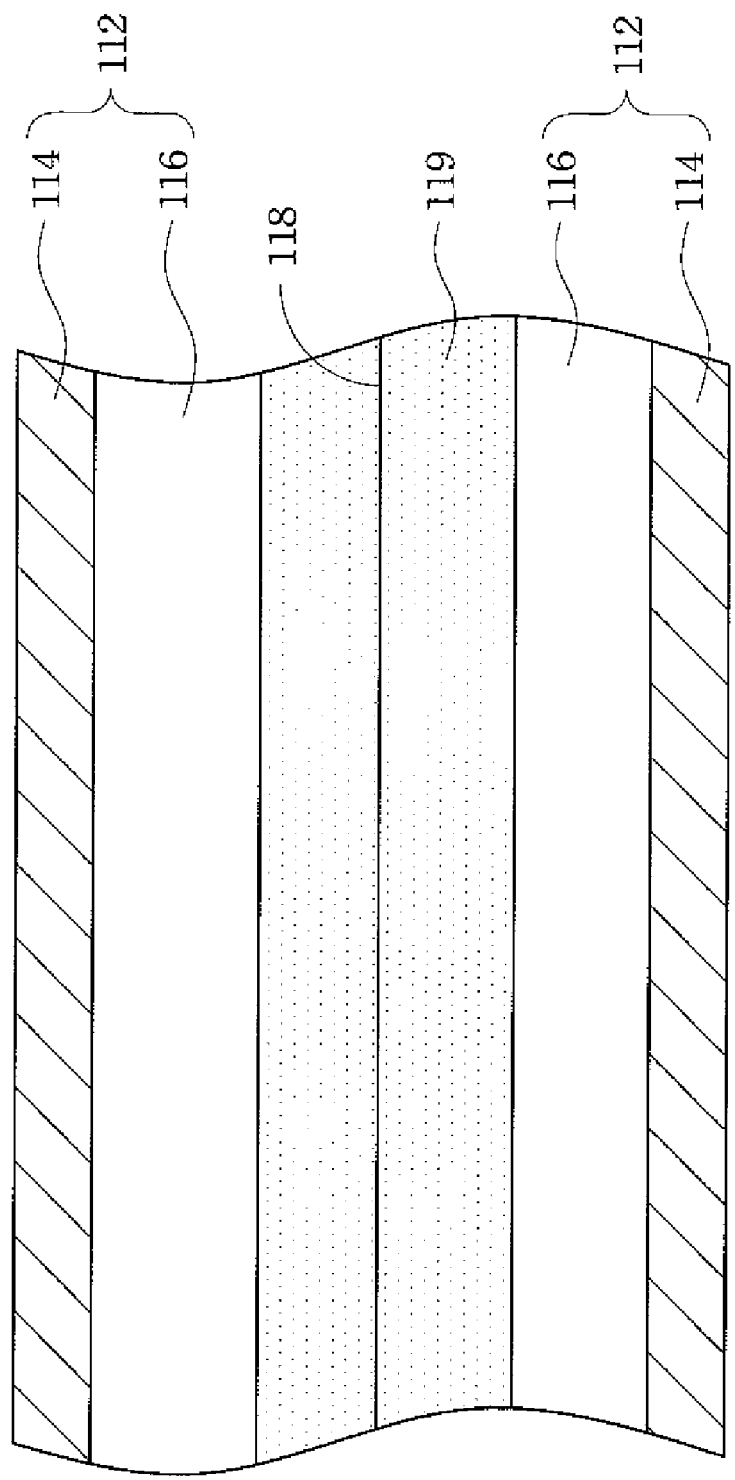
FIG. 1C is a cross-sectional view taken along the A-A' line of the flexible textile capacitor 110 of FIG. 1A.

The flexible textile capacitor 110 of the flexible power supply apparatus 100 is flexible so that it can be flexed or bent into any suitable shape. Therefore, the flexible power supply apparatus 100 is easy to store and extremely portable. FIG. 1C is a cross-sectional view taken along the A-A' line of the flexible textile capacitor 110 of FIG. 1A. In FIG. 1C, the flexible textile capacitor 110 comprises two flexible electrodes 112 disposed in pairs, an isolating membrane 118 and an electrolyte 119. The flexible electrode 112 comprises a carbon fiber textile layer 116 and a metal collector plate 114 formed on the surface of the carbon fiber textile layer 116. The isolating membrane 118 is disposed between two flexible electrodes 112. The electrolyte 119 is filled between the flexible electrodes 112.

The charging part 130 can be designed to have any suitable shape depending on the user's need. For example, the charging part 130 can be a charging base of an electronic apparatus. The power supply 120, for example, is an AC power supply or a solar cell such as a flexible solar cell. When the voltage of the power supply 120 is unstable, the flexible textile capacitor 110 and charging part 130 that are connected in parallel can provide good voltage regulation. In addition, when the power supply 120 is a solar cell, the flexible textile capacitor 110 and charging part 130 that are connected in parallel in conjunction with the control circuit 140 can enhance the charging efficiency of the flexible power supply apparatus 100 under faint ambient light. The enhancement of the charging efficiency will be discussed later in "Efficiency analysis of energy storage".

In FIG. 1A and FIG. 1B, in order to further improve the performance of the flexible power supply apparatus 100, the flexible power supply apparatus 100 further comprises a secondary battery 170. The secondary battery 170 stores the energy and is electronically coupled with the control circuit 140, the power supply 120, and the flexible textile capacitor 110.

In addition, in order to minimize the space occupied by the flexible power supply apparatus 100 and provide better aesthetic effect, the power supply 120, the control circuit 140, and the secondary battery 170 are also disposed on the surface of the flexible textile capacitor 110.

Energy Storage Textile

Figure 2A:
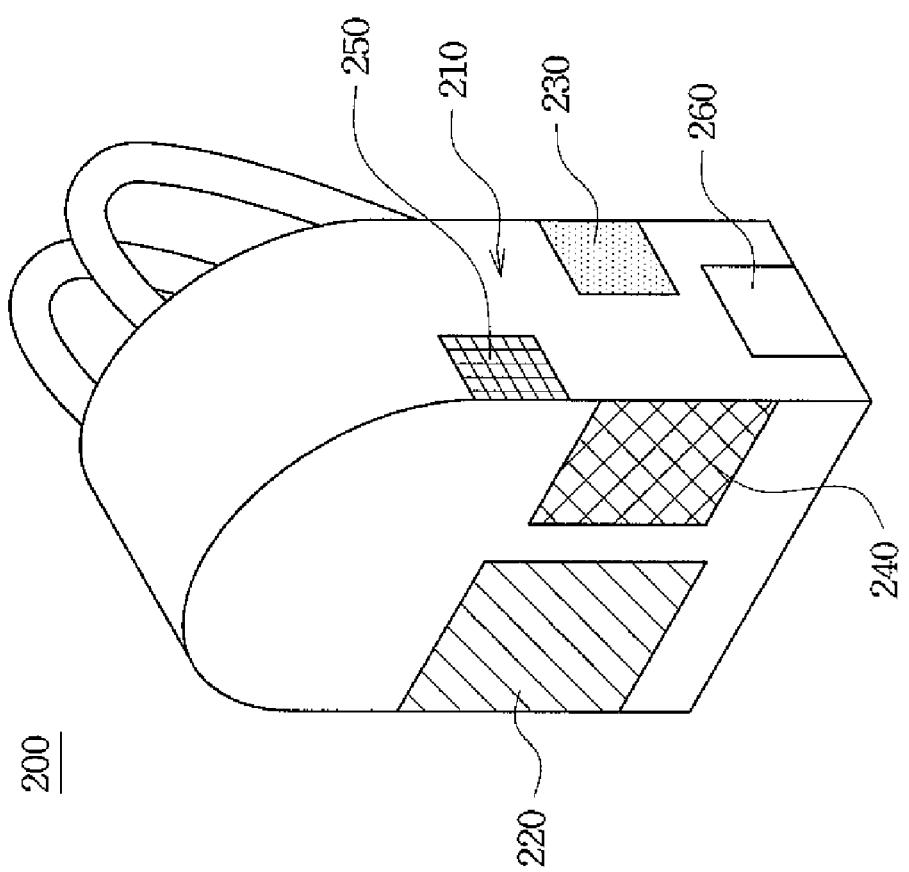
FIG. 2A is a schematic diagram illustrating the energy storage backpack according to another embodiment of the present invention.
Figure 2B:
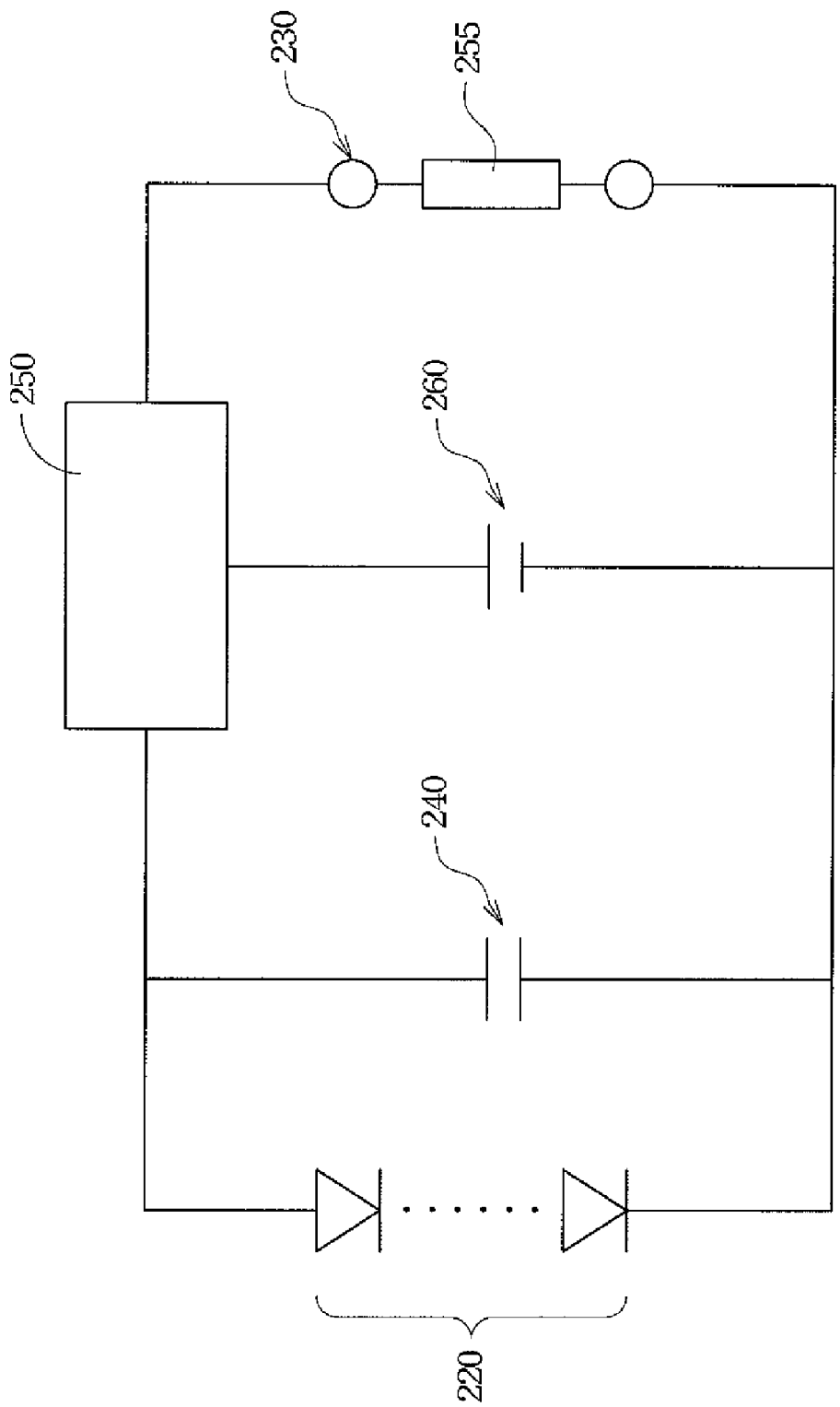
FIG. 2B is a schematic diagram illustrating the equivalent circuit of the circuit elements of the energy storage backpack of FIG. 2A.

The flexible power supply apparatus of the present invention can be is further used with other textiles such as a backpack or a briefcase to produce an energy storage textile. FIG. 2A is a schematic diagram illustrating the energy storage backpack according to another embodiment of the present invention. FIG. 2B is a schematic diagram illustrating the equivalent circuit of the circuit elements of the energy storage backpack of FIG. 2A. The energy storage backpack 200 comprises a backpack body 210, a solar cell 220, a charging part 230, a flexible textile capacitor 240, and a control circuit 250. The backpack body 210 is woven from textile. The solar cell 220, the charging part 230, the flexible textile capacitor 240, and the control circuit 250 are coupled in accordance with the equivalent circuit of FIG. 2B. The interaction among the circuit elements in FIG. 2B is the same as the embodiment of FIG. 1B and thus is not described in detail for the sake of brevity.

More specifically, the solar cell 220 can be disposed on the surface of the backpack body 210 that is facing the light irradiation so as to enhance the absorbance efficiency of sunlight. The solar cell 220 can be a flexible solar cell so that even if the energy storage backpack 200 is slightly flexed or bent by the user, the solar cell 220 is not damaged. By using the flexible solar cell of this embodiment, it is possible to manufacture a solar cell with a larger area thus increasing the energy storage effect of the energy storage backpack 200.

The charging part 230 can be a charging base disposed within the interior space of the surface or backpack body 210. The charging part 230 charges the chargeable element 255 such as an electronic product or a charging battery. Of course, the charging part 230 can be disposed at other locations and electronically coupled with the solar cell 220 via a conducting wire.

The flexible textile capacitor 240 can be disposed on the surface of the backpack body 210 or within the textile layer constituting the backpack body 210. The structure of the flexible textile capacitor 240 is the same as the flexible textile capacitor 110 of the embodiment of FIG. 1C and thus is not described in detail for the sake of brevity. The control circuit is disposed on the surface of the backpack body 210 or the interior space thereof.

As the previous embodiment of the present invention, the backpack 200 of this embodiment can also comprise a secondary battery 260 to store energy. The secondary battery 260 is electronically coupled with the control circuit 250, the solar cell 220, and the flexible textile capacitor 240. Also, the location of the secondary battery 260 can be the surface of the backpack body 210 or within the textile layer constituting the backpack body 210.

Efficiency Analysis of Energy Storage

Efficiency analysis of energy storage was performed so as to illustrate that the charging effect of the flexible power supply apparatus/energy storage textile of the above-mentioned embodiments can be enhanced by the flexible textile capacitor. The flexible power supply apparatus/textiles with or without the capacitor were irradiated under different weather conditions. The secondary battery was used as the chargeable element. Table 1 lists the parameters under which the experiments was conducted and the results thereof.

TABLE 1

| Weather condition | Example | | Light intensity (%) | Duration of light irradiation (min) | Energy stored in the capacitor (J) | Energy stored in the battery (J) | Storage Efficiency of energy (J/min) |
|---|---|---|---|---|---|---|---|
| Overcast/cloudy; 23° C. | E1 | A | 5.97 | 148 | 35.64 | 3183.48 | 21.51 |
| | | B | 7.21 | 105 | 0 | 747.6 | 7.12 |
| Cloudy; 22° C. | E2 | A | 8.71 | 142 | 35.64 | 4230.18 | 29.79 |
| | | B | 11.53 | 210 | 0 | 714 | 3.40 |
| Cloudy; 22° C. | E3 | A | 11.85 | 118 | 112.86 | 3171.84 | 26.88 |
| | | B | 21.39 | 136 | 0 | 2254.88 | 16.58 |
| Overcast/cloudy; 22° C. | E4 | A | 49.27 | 107 | 63.36 | 4239.64 | 39.62 |
| | | B | 50.76 | 150 | 0 | 4545 | 30.30 |
| Fair; 26° C. | E5 | A | 78.24 | 60 | 112.86 | 2043 | 34.05 |
| | | B | 82.87 | 43 | 0 | 1451.25 | 33.75 |

TABLE 1-continued

| Weather condition | Example | Light intensity (%) | Duration of light irradiation (min) | Energy stored in the capacitor (J) | Energy stored in the battery (J) | Storage Efficiency of energy (J/min) |
| --- | --- | --- | --- | --- | --- | --- |

Weather conditions are issued by the Central Weather Bureau of ROC.

Light intensity is calculated as follow:

Current generated under specific weather condition/Theoretical current under maximum light irradiation*100%.

Energy stored in the capacitor means the energy stored in the capacitor after a predetermined period of light irradiation (i.e., the duration of light irradiation), wherein "0" means there is no capacitor disposed therein (Examples in B series).

Energy stored in the battery means the energy stored in the secondary battery after a predetermined period of light irradiation (i.e., the duration of light irradiation).

Storage efficiency of energy is calculated as follow:

The energy stored in the battery/The duration of light irradiation.

Table 1 shows the flexible textile capacitor significantly enhanced the energy storage efficiency of the battery. Under lower light intensity such as the weather conditions of Example E1 and Example E2, the energy storage efficiency of the secondary battery increased from 7.12 (in Example E1-A) to 21.51 (in Example E1-B) and 3.40 (in Example E2-A) to 29.79 (in Example E2-B), respectively. Therefore, the flexible power supply apparatus/energy storage textile of the embodiments of the present invention exhibits good charging efficiency.

Bearing Ratio Test of the Flexible Textile Capacitor

The energy storage textiles of the embodiments of the present invention such as backpacks or briefcases have to bear contents with some weight. Bearing ratio test of the flexible textile capacitor was performed to make sure that the weight of the contents would not damage the function of the flexible textile capacitor within the energy storage textile nor affect the overall function of the energy storage textile.

Figure 3:
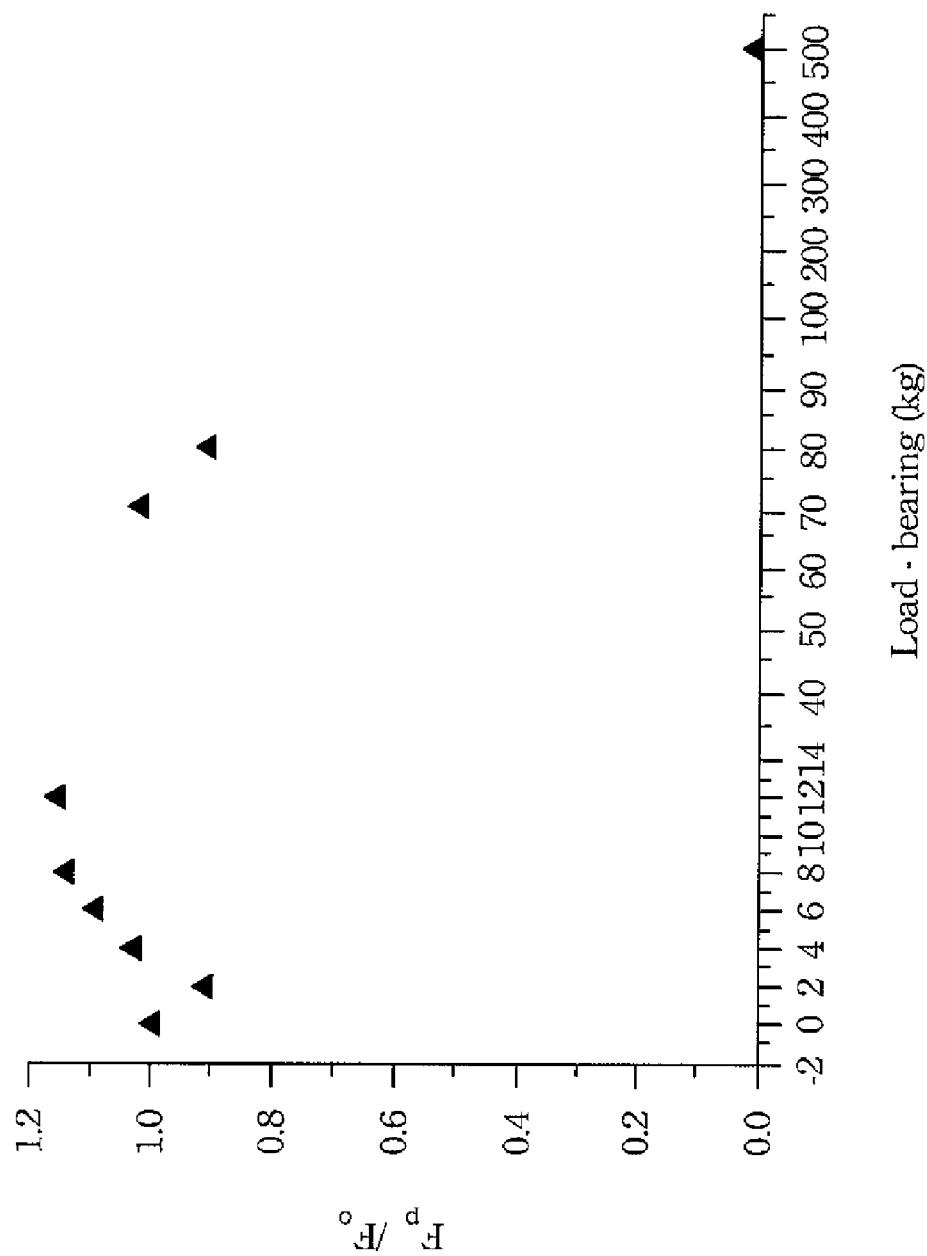
FIG. 3 is a schematic diagram illustrating the load bearing ratio of the capacitance of the flexible textile capacitor.

FIG. 3 is a schematic diagram illustrating the load bearing ratio of the capacitance of the flexible textile capacitor, wherein $F_p$ and $F_o$ represent the capacitance of the textile capacitor during and before the load is applied, respectively. It can be seen from FIG. 3 that between 0 kg and 100 kg, the $F_p/F_o$ ratio of the flexible textile capacitor is higher than 0.9. In some cases, such as when the weight is between 4 kg and 14 kg or 70 kg, the $F_p/F_o$ ratio is larger than 1. In other words, the capacitance of the flexible textile capacitor is increased due to the external weight applied to the flexible textile capacitor.

In FIG. 3, the flexible textile capacitor of the energy storage textile according to the embodiments of the present invention has a load-bearing of about 100 kg. In other words, the flexible textile capacitor of the energy storage textile according to the embodiments of the present invention can be disposed at any position within the textile, such as the bottom of the textile.

The Flexibility Test

The flexible power supply apparatus/energy storage textile of the embodiments of the present invention usually experiences flexing and/or bending during operation. The flexible textile capacitor according to the embodiments of the present invention must exhibit good flexibility in order to prevent the interior elements such as the capacitor of the flexible textile capacitor from being damaged by flexing. Flexibility tests were performed to establish the flexibility of the capacitor of the flexible textile capacitor. In the flexibility test, the flexible textile capacitor was flexed under different radius of curvature and flexed for different times. The capacitance of the flexible textile capacitor before, during, and after flexing was measured.

Figure 4:
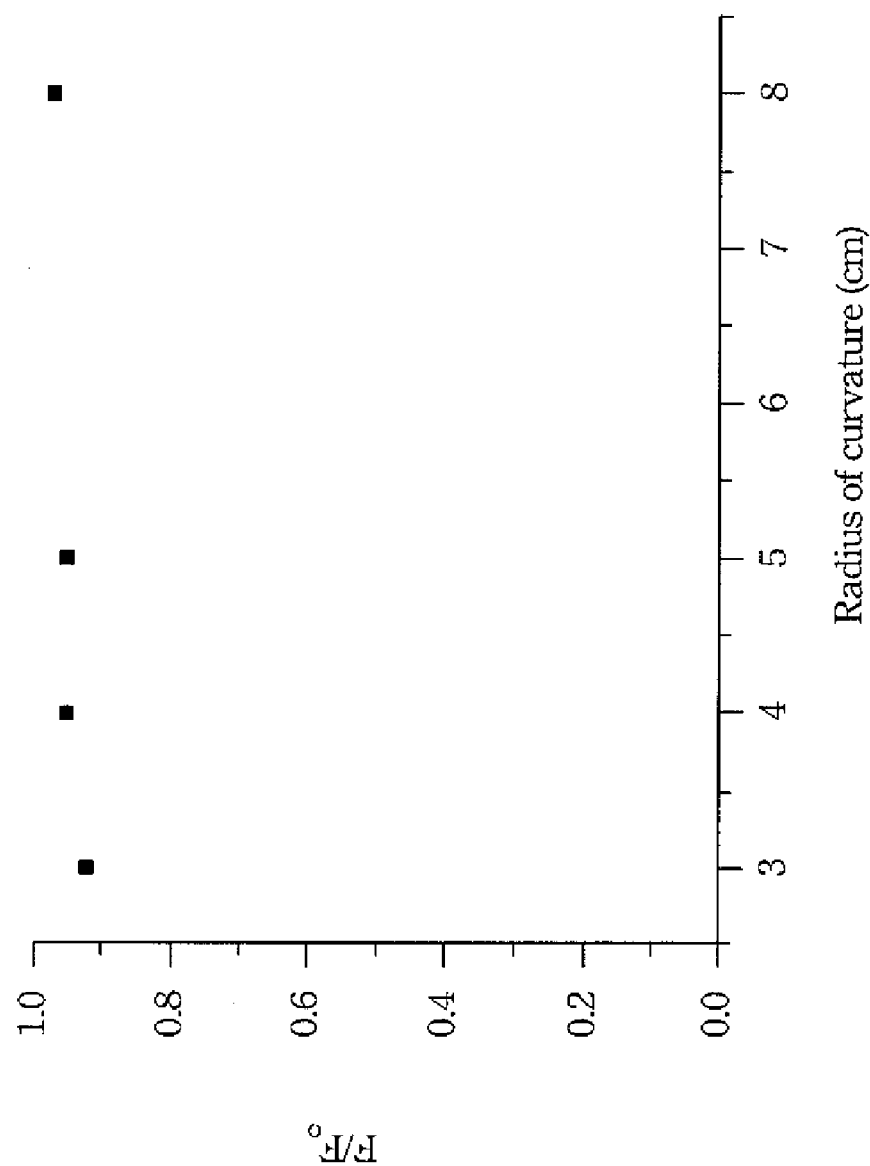
FIG. 4 is a schematic diagram illustrating the capacitance of the flexible textile capacitor under the flexing of various radius of curvature.
Figure 5:
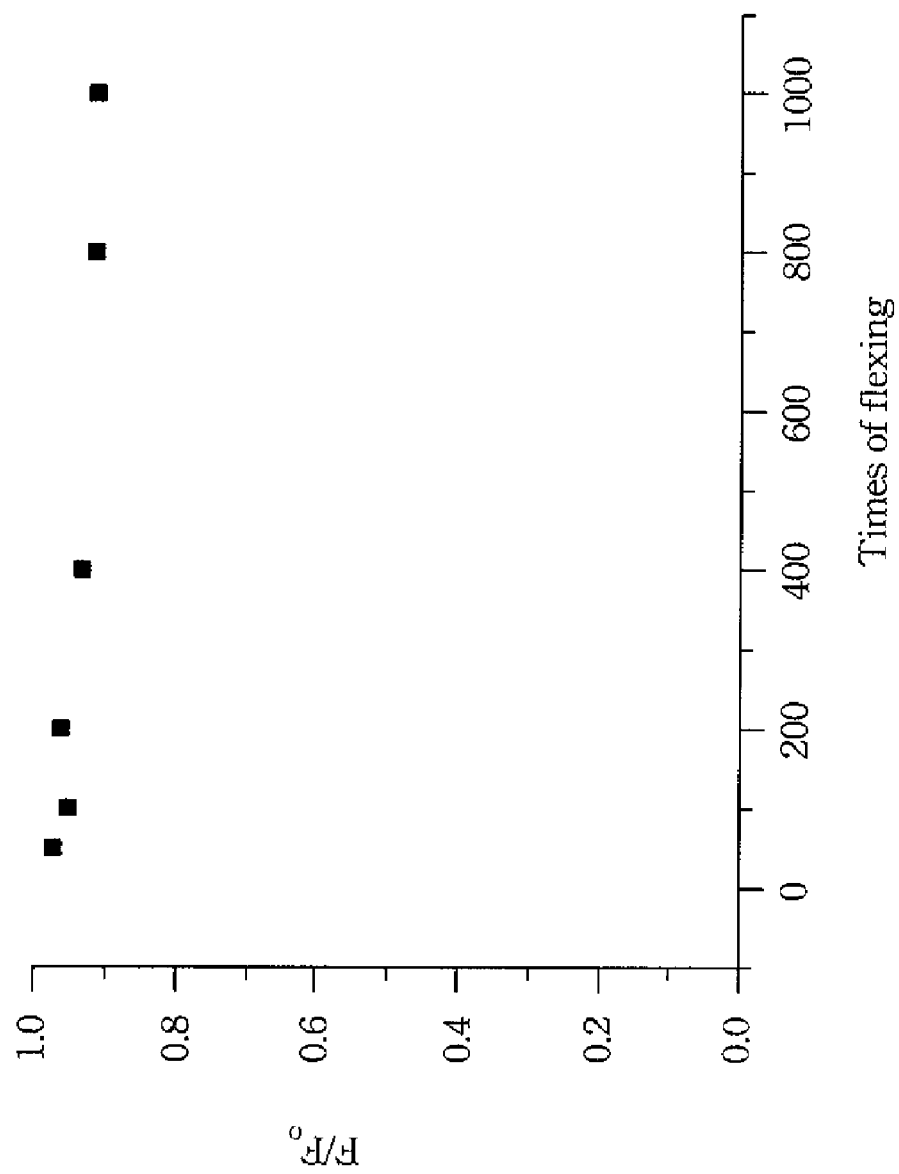
FIG. 5 is a schematic diagram illustrating the capacitance of the flexible textile capacitor under multiple times of the flexing of a radius of curvature of 3 cm.

FIG. 4 is a schematic diagram illustrating the capacitance of the flexible textile capacitor under the flexing of various radius of curvature, wherein $F_p$ and $F_o$ represent the capacitance of the textile capacitor during and before the textile capacitor being flexed, respectively. FIG. 5 is a schematic diagram illustrating the capacitance of the flexible textile capacitor under multiple times of the flexing of a radius of curvature of 3 cm, wherein $F_p$ and $F_o$ represent the capacitance of the textile capacitor after and before the textile capacitor being flexed, respectively.

It can be seen from FIG. 4 that when the radius of curvature changes, the capacitance of the flexible textile capacitor is higher than about 90 percent of the capacitance before being flexed. It can be seen from FIG. 5 that after being flexed 1000 times, the capacitor of the flexible textile capacitor is higher than about 90 percent of the capacitance before being flexed. Therefore, the energy storage textile/the flexible power supply apparatus having the flexible textile capacitor according to the embodiments of the present invention exhibit excellent flexibility.

It will be apparent to those skilled in the art that various modification, and variations can be made to the structure of the present invention without departing from the scope or spirit of the invention. In view of the foregoing, it is intended that the present invention cover modifications, and variations of this invention provided they fall within the scope of the following claims.

What is claimed is:

1. A flexible power supply apparatus, comprising:
 a flexible textile capacitor, the flexible textile capacitor has an $F_p/F_o$ ratio higher than about 0.9, wherein $F_p$ and $F_o$ represent the capacitance of the flexible textile capacitor during and before a load is applied thereon, respectively;
 a power supply electronically coupled with the flexible textile capacitor;
 a charging part for charging an electronic product or a secondary battery, the charging part electronically coupled with the power supply, wherein the charging part and the flexible textile capacitor are connected in parallel, and wherein the flexible textile capacitor discharges a current to the charging part when the flexible textile capacitor is charged to a predetermined charging level; and
 a control circuit for controlling the charging and discharging of the charging part and the flexible textile capacitor, the control circuit electronically coupled with the flexible textile capacitor, the power supply, and the charging part.

2. The flexible power supply apparatus of claim 1, wherein the flexible textile capacitor comprises:

two flexible electrodes disposed in pairs, wherein each
  flexible electrode comprises:
  a carbon fiber textile layer; and
  a metal collector plate formed on a surface of the carbon
    fiber textile layer;
  an isolating membrane disposed between the flexible
    electrodes; and
  an electrolyte filled between the flexible electrodes.

3. The flexible power supply apparatus of claim 1, wherein the power supply is disposed on the surface of the flexible textile capacitor.

4. The flexible power supply apparatus of claim 1, wherein the power supply is a solar cell.

5. The flexible power supply apparatus of claim 4, wherein the solar cell is a flexible solar cell.

6. The flexible power supply apparatus of claim 1, wherein the power supply is an alternating power supply.

7. The flexible power supply apparatus of claim 1, wherein the control circuit is disposed on the surface of the flexible textile capacitor.

8. The flexible power supply apparatus of claim 1, wherein the charging part is a charging base.

9. The flexible power supply apparatus of claim 1, further comprising a secondary battery electronically coupled with the control circuit, the power supply, and the flexible textile capacitor.

10. The flexible power supply apparatus of claim 9, wherein the secondary battery is disposed on the surface of the flexible textile capacitor.

11. An energy storage textile, comprising:
  a textile;
  a solar cell disposed at one surface of the textile, wherein the surface faces light irradiation;
  a charging part for charging an electronic product or a secondary battery, the charging part electronically coupled with the solar cell;
  a flexible textile capacitor disposed on the surface of the textile or within the textile, the flexible textile capacitor electronically coupled with the solar cell, and wherein the flexible textile capacitor discharges a current to the charging part when the flexible textile capacitor is charged to a predetermined charging level, wherein the flexible textile capacitor has an $F_p/F_o$ ratio higher than about 0.9, wherein $F_p$ and $F_o$ represent the capacitance of the flexible textile capacitor during and before a load is applied thereon, respectively; and
  a control circuit for controlling the charging and discharging of the charging part and the flexible textile capacitor, the control circuit electronically coupled with the solar cell, the charging part, and the flexible textile capacitor.

12. The energy storage textile of claim 11, wherein the solar cell is a flexible solar cell.

13. The energy storage textile of claim 11, wherein the flexible textile capacitor comprises:
  two flexible electrodes disposed in pairs, wherein each flexible electrode comprises:
  a carbon fiber textile layer; and
  a metal collector plate formed on a surface of the carbon fiber textile layer;
  an isolating membrane disposed between the flexible electrodes; and
  an electrolyte filled between the flexible electrodes.

14. The energy storage textile of claim 11, wherein the charging part is a charging base.

15. The energy storage textile of claim 11, further comprising a secondary battery electronically coupled with the control circuit, the solar cell, and the flexible textile capacitor.

16. The energy storage textile of claim 15, wherein the secondary battery is disposed on the surface of the textile or within the textile.

17. The energy storage textile of claim 11, wherein the control circuit is disposed on the surface of the textile or within the textile.

18. The energy storage textile of claim 11, wherein $F_p/F_o$ ratio is higher than about 1.

19. The flexible power supply apparatus of claim 1, wherein $F_p/F_o$ ratio is higher than about 1.

20. The flexible power supply apparatus of claim 1, wherein the flexible textile capacitor has a load-bearing of about 100 kg.

* * * * *